Sept. 2, 1958  C. B. DE VLIEG ET AL  2,849,902
PRESETTING BORING BAR AND TOOL HOLDER
Filed Nov. 18, 1955
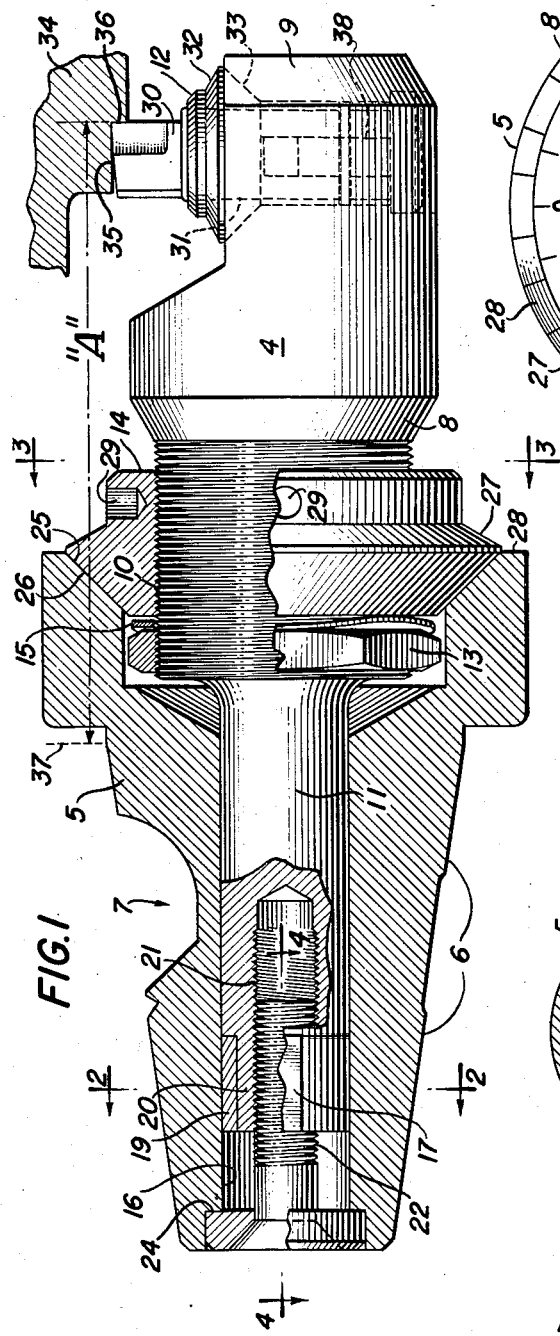
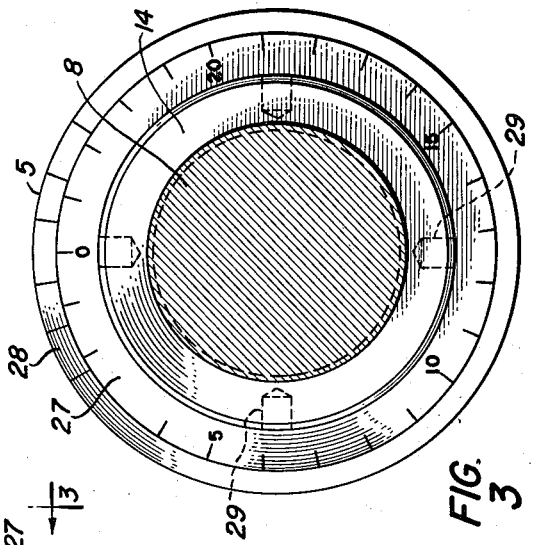
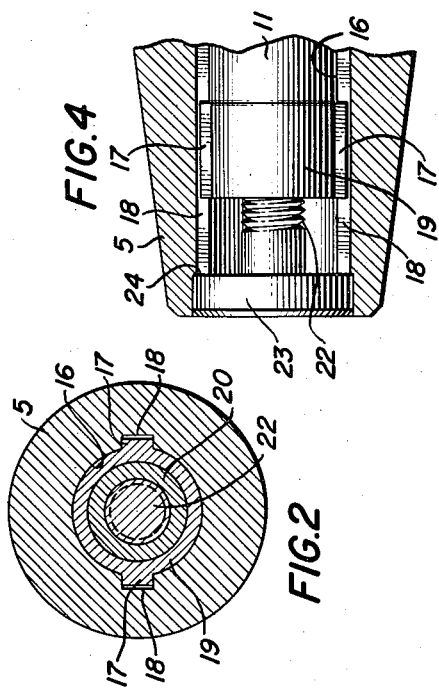
Inventors
CHARLES B. DeVLIEG
and ALLEN N. SWEENY
by McCanna & Morsbach
Attorneys

United States Patent Office 2,849,902
Patented Sept. 2, 1958

2,849,902

PRESETTING BORING BAR AND TOOL HOLDER

Charles B. De Vlieg, Detroit, and Allen N. Sweeny, Grosse Pointe Farms, Mich., assignors, by mesne assignments, to De Vlieg Machine Company, Ferndale, Detroit, Mich., a corporation of Michigan Application November 18, 1955, Serial No. 547,815

4 Claims. (Cl. 77—58)

This invention relates to tool holders of the kind used in the machine tool industry for a wide range of metal cutting operations such as drilling, boring, and milling operations. The invention is particularly intended for the problems incident to what is commonly known as production manufacture and involving a high degree of precision in the repetitive operations. These problems involve the changing of tools and repositioning of tools in holders and the need for extreme accuracy in making these changes so as to insure accurate duplication of machining operations when the cutting tools have to be moved in and out of the tool holders or have to be changed for successive cutting operations with different tools.

The changing of cutting tools in production operations necessarily involves the skill of the operator and the time required for accurately setting each tool according to its requirement. When we consider the wide range of work such as roughing and finishing operations, precision boring, and general purpose work, the many materials to be worked on, the special cutting elements such as carbide tips, high speed steel tips, cast alloy tips, and diamond tips, also the special requirements for each job as to dimensional tolerances in the cutting operation, we encounter the problem of time of the operator consumed in making these changes. This time factor may be large depending on the construction of the tools and tool holders and also on the skill of the operator, and the accumulated time may become a very uncertain and costly factor in production manufacture.

The main object of the present invention is to provide a new and improved tool holder particularly adapted for promoting greater efficiencies both in accuracy and in the time factor involved in the setting and presetting of metal cutting tools in machining operations.

Our invention aims to provide a tool holder which may be quickly and easily set and reset to a high degree of precision for a wide variety of machining operations, with minimum of time and application of skill on the part of the operator.

Our invention also aims to provide what we may term a presetting tool holder of new and improved construction which will enable greater rigidity and accuracy in the mounting of the tool and therefore promote greater efficiencies and economies in production manufacture of the kind to which this invention relates.

Other objects and attendant advantages will be appreciated by those skilled in this art as the invention becomes better understood by reference to the following description when considered in connection with the accompanying drawing, in which:

Figure 1 is a longitudinal section, partly in elevation, of a presetting tool holder embodying our invention;

Figures 2 and 3 are cross-sections taken respectively on the section lines 2—2 and 3—3 of Figure 1; and Figure 4 is a longitudinal section taken on the section line 4—4 of Figure 1.

Our invention contemplates the provision of a tool holder unit of assembly designated generally by the reference numeral 4 which is mounted in a complemental holder unit designated generally by 5. This holder 5 preferably has a taper end 6 adapted for mounting in the taper socket of a tool spindle (not shown). The taper shown is known as the NMTB taper, a standard adopted by the National Machine Tool Builders. This taper is designed to be non-sticking but in view of the extreme firmness and rigidity desired in the engagement between these tapered parts and the fact that some workmen unduly force the tool holder into the taper socket, it is sometimes difficult to remove the tool holder without hammering or drifting, as is well known in this art. In Patent No. 2,816,770, granted December 17, 1957, we have provided a novel means for locking the taper tool holder in the taper socket and for ejecting the tool holder. In Figure 1 the cut-away profile 7 at the top of the taper portion 5 is part of the construction used in our said application.

The tool holder unit of assembly 4 comprises a body member 8 having a tool holder head 9, an exteriorly threaded central portion 10, and a cylindrical pilot end 11; a cutting tool cartridge designated generally by 12 mounted in the head 9; and a nut 13 and a graduated dial member 14 threaded on the central portion 10 of the body member 8 with a spring steel washer 15 interposed between the nut 13 and dial member 14. The washer 15 is of the wave type having a three point bearing against adjacent parts to serve certain functions described later. The pilot end 11 fits in a bore 16 concentric with the taper portion 6 and is provided at its inner end with suitable keys 17 which fit in keyways 18 in the taper holder 6. In this instance the keys 17 are integral with a sleeve 19 which is suitably fixed on the reduced end 20 of the pilot end 11, as by brazing. This pilot end is bored and threaded at 21 to receive a threaded locking screw 22 which has a head 23 adapted to seat against a shoulder 24 on the taper holder 6. The dial member 14 has a conical face 25 which seats against a complemental conical face 26 in the holder 5 concentric with the center bore 16. The dial member 14 has suitable dimension graduations on its face 27 which register with complemental graduations on the face 28 of the holder body 5. The dial member 14 also has suitable means such as openings 29 for receiving an implement for the purpose of turning the dial on its threaded mounting in the operation of setting the tool holder unit axially with respect to the holder body 5.

The cutting tool 30 is suitably mounted on the head 9 with capacity for precision adjustment crosswise of the longitudinal center axis of the tool holder body 8. We prefer, however, to use a cartridge type tool holder of the kind disclosed in De Vlieg Patent No. 2,537,517, granted January 9, 1951. In the instant case the cutting tip 30 is fixed to a cartridge body 31 on which is threaded a graduated dial 32 which has a conical portion seating against a conical face 33 on the head 9. A locking screw 38 is threaded into the body 31 and serves to lock the tool cartridge in the precision setting determined by the dial 31, suitable key means being provided between the head 9 and the cartridge body 31 to prevent rotative movement of the latter in the head 9. The cutting tip 30 may be of tungsten carbide, high speed steel, cast alloy, diamond, or the like. The tool cartridges 12 may be made for a great variety of cutting operations.

As above pointed out, our invention is particularly advantageous for resetting a cutting tool of this character where a high degree of precision is desired. As an illustration of the use of our improved tool holder, we may assume that the tool holder with the cutter shown in Figure 1 is being used in production manufacture of a work-piece 34 wherein it is desired to accurately bore the face 35 to a shoulder face 36, both the dimensions of 35 and 36 being critical. Assuming that the cutter 30 requires sharpening, the tool holder will be withdrawn from the work-piece for regrinding and resetting the cutter. The entire taper unit with its tool holder unit 4 will then be removed from the spindle. The cutter 30 will then be removed and ground to the desired shape. The cutter 30 will be replaced in the head 9 and reset for the diameter dimension as, for example, in the manner disclosed in De Vlieg Patent No. 2,652,634, granted September 22, 1953. The tool holder unit 4 will then be mounted in the taper holder 5 in the assembly shown in Fig. 1. This assembly will then be placed in a suitable gage for resetting the cutting tool 30 in a direction axially of the longitudinal axis of this assembly in order to locate the cutting edge of the tool (which cuts the shoulder 36) a predetermined distance from a gage or base line 37, which distance is indicated in Figure 1 by the letter A. A suitable base line such as 37 may be selected. In practice we prefer to use a line which is coincident with the beginning of the taper portion 6. In setting the cutter to this dimension A, the locking screw 22 is loosened and this permits turning the dial member 14 for locating the cutter 30 at the desired position. Where only a slight degree of adjustment is needed, this may be obtained without changing the position of the nut 13. This is due to the resiliency provided by the wave washer 15. This washer provides a three point bearing between the nut 13 and the dial member 14 and serves to impart a resilient end thrust uniformly circumferentially against the dial member 14 and through this dial member against the corresponding conical face 26 on the taper member. In other words, the wave washer serves to eliminate unequal thrust between the nut 13 and the dial member in the event of any variations or inaccuracies in the threaded mounting of the nut 13 on the tool holder 4 and it also serves to allow slight adjustments of the dial member without unlocking the nut 13. In actual practice with a tool holder of the type and kind shown in Fig. 1, these slight adjustments of the dial member refer to the adjustments after repeated grinding or re-sharpening of the cutter 30 necessitated by continuous use of the tool as in production operations. For example, the amount of metal removed as by grinding from the face of the cutter for re-sharpening may be from approximately .005 to .010 of an inch. With the construction here shown this would provide from three to six (sometimes more) re-sharpenings of the cutter without resetting the nut 13. This is important in production manufacture because it effects a substantial saving of time. Furthermore, the construction serves additional functional advantages in that by eliminating unequal thrust between the nut 13 and the dial member 14 we insure against variations or displacements in the precision location of the cutter point which might otherwise occur between the time that the dial member is set and the time the tool is placed into actual operation in performing its cutting function. We have discovered that regardless of the accuracy and precision in manufacture of the various parts of a tool holder such as here disclosed and after due care by skilled mechanics in setting and resetting the tool to a predetermined dimension, a slight displacement of the cutter point is apt to occur at some time in the cutting operation regardless of rigidity of the parts in their connection one to the other and regardless of the high degree of accuracy to which the parts are machined to their respective desired shapes. More particularly with reference to the threaded connection between the nut 13 and the dial member 14 on the tool holder 4 through means of the threads 10, we have found that even slight variation in the axial thrust between the parts 13 and 14 circumferentially thereabout may result in unequal seating of the dial member 14 at the conical surfaces 25—26, with the result that even though these assembled parts are firmly and rigidly set in the preselected position for operation, slight displacement of the cutter point with respect to the mounting of the tool unit 5 in the spindle may occur after the tool is put into cutting operation. We have eliminated this by the provision of the wave washer 15 which has a three-point bearing between the nut 13 and the dial member 14, which points are equally spaced circumferentially of these parts whereby to impart the uniform but resilient end thrust above described. This serves to compensate for any slight irregularities or variations in manufacture of the coacting parts 10—13—14 and to insure accurate seating of the dial member 14 on the holder unit 5. We have found that this serves the advantageous function of eliminating displacements in the final position of the cutter, such as described. This construction also is advantageous in that it serves to prevent accidental displacements of the cutter with respect to the holder unit 5 after resetting, such as might be incident to contacts of any of these parts with other objects during the handling or bodily movement of the unit as a whole between the time the tool is reset and the time it is installed in the spindle for operation. Where greater axial adjustment of the cutter is desired, the holder 4 should be removed from the taper member 5 by first removing the locking screw 22, whereupon the nut 13 may be adjusted one way or the other to permit of the desired setting of the dial member 14 and the desired coaction between the nut 13 and the dial member 14 in the adjusted position of the latter. The final precise resetting adjustment of the dial member 14 is performed preferably with the entire holder assembly positioned in a suitable gage in order to attain the exact dimension A, whereupon the locking screw 22 is tightened to effectively and solidly lock the tool holder 4 in the taper holder 5. In this connection it is important that the tool holder unit 4 be maintained very accurately concentric and in coaxial relation with the tool holder unit 5, which relationship is insured by the accuracy in the seating of the dial member 14 against the holder 5 and also by the relatively long pilot end 11 which by its coaction in the central bore through the taper end of the unit 5 is a factor in maintaining this relationship. An alternative method of resetting for the axial location of the cutter 30 is to remove the tool holder unit 4 from the taper holder 5 and remount the tool holder unit 4 in a suitable gage having a conical face such as 26 and then adjusting the conical member 14 with its face 25 seated against the face 26 of the gage. Thus, when the tool holder unit 4 is remounted in the taper holder 5 it will accurately position the cutter axially with respect to the taper holder and accurately in the attainment of a pre-determined dimension such as A. It will be apparent from the foregoing that this construction provides for several methods of setting and resetting a cutter tool axially with respect to its holder.

It should also be observed that our invention may be used in a straight shank instead of the taper shank or holder 5, also that it may be used directly in a drive spindle. In such modifications there would, of course, be provided a suitable means equivalent to the lock nut 23 for serving to lock the dial member 14 against a conical seat such as 26 in the spindle or shank as the case may be.

It will be manifest to those skilled in this art that changes and modifications may be made without departing from the spirit and scope of our invention as expressed in the appended claims, in which we claim:

1. A presetting boring bar and tool holder comprising, in combination, a tool holder supporting body adapted to be mounted in a spindle or the like for rotation, said body having a central bore, said bore having a conical face providing a conical seat at one end and a cylindrical pilot seat coaxial with said conical seat, a tool holder unit having at one end a cylindrical pilot portion seating in said cylindrical pilot seat, at its opposite end a tool holding head, and an exteriorly threaded portion intermediate said head and said pilot portion coaxial with the pilot portion, a graduated dial member threaded on said threaded portion having a conical face complemental to and seating on said conical face, said dial member and said supporting body having complemental graduations indicating the setting of the tool holder unit axially with respect to the supporting body, means operative between said cylindrical pilot portion and said supporting body to draw the tool holder unit axially within said body to clamp the conical face of the dial member against said conical seat on the supporting body, and means coacting between said threaded portion and said dial member for imposing yielding end thrust against said dial member uniformly at three points equally spaced circumferentially thereof to effect uniform seating of the conical face of the dial member on the supporting body and for imparting such force continuously through a limited number of successive settings of said dial member incident to resetting the tool in connection with successive re-sharpening of the tool.

2. A presetting boring bar and tool holder as set forth in claim 1, in which the means coacting between the threaded portion and the dial member comprises a nut threaded on said threaded portion spaced inwardly from the dial member, and a wave type spring steel washer on said threaded portion intermediate said nut and said dial member for imposing yielding end thrust against said dial member uniformly at three points equally spaced circumferentially thereof to effect uniform seating of the conical face of the dial member on the supporting body and for imparting such force continuously through a limited number of successive settings of said dial member incident to resetting the tool in connection with successive re-sharpening.

3. A tool holder comprising, in combination, a tool holder supporting body adapted for rotation, said body having a central through bore, said bore having a conical face providing a conical seat at one end and having a cylindrical pilot seat coaxial with said conical seat, a tool holder having at one end a cylindrical pilot portion seating in said cylindrical pilot seat, at its opposite end a cutter, and an exteriorly threaded portion intermediate said cutter and said pilot portion coaxial with the pilot portion, a graduated dial member threaded on said threaded portion having a conical face complemental to and seating on said conical face, said dial member and said supporting body having complemental graduations indicating the setting of the tool holder axially with respect to the supporting body, means operative between said cylindrical pilot portion and said supporting body to draw the tool holder axially within said body to clamp the conical face of the dial member against said conical seat on the supporting body, a nut threaded on said threaded portion spaced inwardly from the dial member, and a wave type spring steel washer on said threaded portion intermediate said nut and said dial member having three point engagement therebetween arranged for imparting resilient thrust equally circumferentially thereof and allowing repeated adjustment settings of the tool holder through adjustment of the dial member without changing the position of the nut on the threaded portion.

4. A tool holder comprising, in combination, a tool holder supporting body adapted for rotation, said body having a through bore, said bore having a conical face providing a conical seat at one end, a tool holder unit having an exteriorly threaded cylindrical portion adapted to be inserted into said bore, a cutter on the opposite end of the tool holder unit, a graduated dial member threaded on said threaded portion having a conical face complemental to and seating on said conical face, said dial member and said supporting body having complemental graduations indicating the setting of the tool holder unit axially with respect to the supporting body, means operative between said inserted end of the cylindrical portion of the tool holder unit and said supporting body to draw the tool holder unit axially thereof within said body to clamp the conical face of the dial member against said conical seat on the supporting body, a nut threaded on said threaded portion spaced inwardly from the dial member, and a wave type spring steel washer on said threaded portion intermediate said nut and said dial member having three point engagement therebetween arranged for imparting resilient thrust equally circumferentially thereof and allowing repeated adjustment settings of the tool holder through adjustment of the dial member without changing the position of the nut on the threaded portion.

References Cited in the file of this patent

UNITED STATES PATENTS

| 1,870,350 | Van Norman | Aug. 9, 1932 |
| 2,367,841 | Monroe | Jan. 23, 1945 |
| 2,537,517 | De Vlieg | Jan. 9, 1951 |

FOREIGN PATENTS

| 713,620 | Germany | Nov. 2, 1941 |